US009583297B2

(12) United States Patent
Benke et al.

(10) Patent No.: US 9,583,297 B2
(45) Date of Patent: Feb. 28, 2017

(54) REMOTE FUSE OPERATION INDICATOR ASSEMBLIES AND RELATED SYSTEMS AND METHODS

(71) Applicant: Eaton Corporation, Cleveland, OH (US)

(72) Inventors: James J. Benke, Pittsburgh, PA (US); Zachary Ryan Jenkins, Pittsburgh, PA (US); Scott Raymond Lanning, Conway, PA (US)

(73) Assignee: Eaton Corporation, Cleveland, OH (US)

( * ) Notice: Subject to any disclaimer, the term of this patent is extended or adjusted under 35 U.S.C. 154(b) by 267 days.

(21) Appl. No.: 14/245,457

(22) Filed: Apr. 4, 2014

(65) Prior Publication Data

US 2015/0287564 A1 Oct. 8, 2015

(51) Int. Cl.
*H01H 85/30* (2006.01)
*F16C 1/10* (2006.01)
*H02B 11/26* (2006.01)

(52) U.S. Cl.
CPC ............. *H01H 85/306* (2013.01); *F16C 1/10* (2013.01); *H02B 11/26* (2013.01)

(58) Field of Classification Search
CPC ........... H01H 85/306; H02B 11/26; F16C 1/10
USPC .................................. 337/244, 306, 265, 267
See application file for complete search history.

(56) References Cited

U.S. PATENT DOCUMENTS

| 2,405,929 | A | * | 8/1946 | Wald | H01H 85/306 337/147 |
| 3,876,948 | A | * | 4/1975 | Blumenthal | H01H 85/306 337/315 |
| 4,281,322 | A | * | 7/1981 | Nasu | H01H 85/32 337/206 |
| 4,322,706 | A | | 3/1982 | Thrash | |
| 5,367,281 | A | | 11/1994 | Crooks | |
| 6,806,808 | B1 | * | 10/2004 | Watters | G01D 5/48 340/10.41 |
| 7,576,635 | B2 | * | 8/2009 | Bender | G06Q 10/06 340/292 |
| 9,299,522 | B2 | * | 3/2016 | Sudhakar | H01H 71/0221 |
| 2005/0231320 | A1 | * | 10/2005 | Ackermann | H01H 9/168 337/206 |
| 2005/0253680 | A1 | * | 11/2005 | Mathews | A61M 25/0021 337/395 |

(Continued)

FOREIGN PATENT DOCUMENTS

DE 2215071 A1 * 10/1973 ................ F16C 1/10
DE 3413219 A1 10/1984
(Continued)

OTHER PUBLICATIONS

DE 3413219 (Oct. 18, 1984)—English Translation.*
(Continued)

*Primary Examiner* — Anatoly Vortman
(74) *Attorney, Agent, or Firm* — Myers Bigel, P.A.

(57) ABSTRACT

A fuse operation indicator assembly includes an elongate tube having first and second ends, a fuse striker receiving member at the first end of the tube and configured to receive a fuse striker, an actuating member at the second end of the tube and configured to be actuated responsive to the fuse striker member, and a detector configured to detect actuation of the actuating member.

11 Claims, 11 Drawing Sheets

(56) References Cited

U.S. PATENT DOCUMENTS

2007/0252670 A1* 11/2007 Darr ..................... H01H 9/104
337/143
2008/0247123 A1* 10/2008 Ulinskas ............. H01H 71/123
361/605
2013/0099889 A1* 4/2013 Durth .................... H01H 37/42
337/306

FOREIGN PATENT DOCUMENTS

| EP | 0 038 274 A1 | 10/1981 |
| FR | 2 591 030 A1 | 6/1987 |
| JP | H0547295 | 2/1993 |

OTHER PUBLICATIONS

EP 0038274 (Oct. 21, 1981)—English Translation.*
International Search Report and the Written Opinion of the International Searching Authority corresponding to International Patent Application No. PCT/IB2015/052212 (15 pages) (mailed Jun. 23, 2015).

* cited by examiner

REMOTE FUSE OPERATION INDICATOR ASSEMBLIES AND RELATED SYSTEMS AND METHODS

BACKGROUND

Fuses are used for overcurrent protection in a wide variety of electrical equipment, such as switchgear. Some fuses have an indicator pin or striker pin that extends out of the fuse cap when the fuse is blown. However, such designs generally require an operator or technician to closely inspect the fuse to determine its state of operation. For example, the technician must step in front of the switchgear and open the switchgear door to see the indicator pin.

A technician should remain away from the switchgear to keep the technician away from potential arc flash energy. Therefore, it is desirable to remotely monitor fuse operation.

SUMMARY

Some embodiments of the present invention are directed to a fuse operation indicator assembly. The assembly includes an elongate tube having first and second ends. The assembly includes a fuse striker receiving member at the first end of the tube and configured to receive a fuse striker. The assembly includes an actuating member at the second end of the tube and configured to be actuated responsive to the fuse striker member. The assembly includes a detector configured to detect actuation of the actuating member.

In some embodiments, the tube is electrically insulating. The tube may have a length of between about 2 and 4 feet.

The striker receiving member may be configured to displace a fluid in the tube when the striker receiving member receives the fuse striker such that the actuating member is displaced. The striker receiving member may include a spring-loaded piston that is configured to displace the fluid.

In some embodiments, the striker receiving member includes a spring-loaded piston that is configured to generate a puff of air through the tube when the striker receiving member receives the fuse striker such that the actuating member is displaced by the puff of air.

The detector may be an electric switch that is configured to generate an electrical signal when the actuating member is actuated. The electric switch may be electrically connected with an indicator that is configured to receive the electrical signal and indicate that a fuse associated with the fuse striker is blown in response to the electrical signal.

Some other embodiments of the present invention are directed to a switchgear. The switchgear includes a housing and a plurality of fuses mounted within the housing. Each fuse has a striker pin that is ejected from the fuse when the fuse is operated. The switchgear includes a plurality of fuse operation indicator assemblies mounted within the housing, one fuse operation indicator assembly for each fuse. The fuse operation indicator assembly includes electrically insulating elongate tube having first and second ends. The fuse operation indicator assembly includes a fuse striker receiving member at the first end of the tube, the fuse striker receiving member positioned and configured to receive the fuse striker pin when it is ejected from the fuse. The fuse operation indicator assembly includes an actuating member at the second end of the tube and configured to be actuated responsive to the fuse striker member. The fuse operation indicator assembly includes a detector configured to detect actuation of the actuating member. The detector and the fuse are mounted in the housing in a spaced-apart relationship.

In some embodiments, the striker receiving member is configured to displace a fluid in the tube when the striker receiving member receives the fuse striker pin such that the actuating member is displaced by the displaced fluid.

The detector may be an electric switch that is configured to generate an electrical signal when the actuating member is actuated. The fuse operation indicator assembly may include a mounting block mounted in the housing. The electric switch may be mounted on the mounting block. The actuating member may be held adjacent the electric switch by a clamping device that is mounted to the mounting block.

In some embodiments, the switchgear includes a plurality of indicators outside the housing. Each indicator may be electrically connected with a respective electric switch. Each indicator may be configured to receive the electrical signal and, in response, indicate that the fuse is operated.

The switchgear may include a controller and a display. The display may be outside the housing. The controller may be electrically connected with each switch of the plurality of fuse operation indicator assemblies. The controller may be configured to receive electrical signals from the switches and control the display to display identifying information associated with the electrical signals. The identifying information may include an identification and/or location of one or more fuses that have operated In some embodiments, the switchgear includes a controller and a transceiver. The controller may be electrically connected with each switch of the plurality of fuse operation indicator assemblies. The controller may be configured to receive electrical signals from the switches and control the transceiver to wirelessly transmit identifying information associated with the electrical signals to an outside device. The identifying information may include an identification and/or location of one or more fuses that have operated Some other embodiments are directed a method for remote monitoring of the operation of a fuse. The method includes providing a fuse operation indicator assembly including an elongate tube having a fuse striker receiving member at a first end of the tube and an actuating member at a second, opposite end of the tube. The method includes receiving a fuse striker pin of a fuse at the fuse striker receiving member. The method includes actuating the actuating member responsive to receiving the fuse striker pin at the fuse striker receiving member. The method includes detecting the actuation of the actuating member. The method includes indicating that the fuse has operated responsive to detecting the actuation of the actuating member In some embodiments, the indicating step includes providing a remote indication that the fuse has operated.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
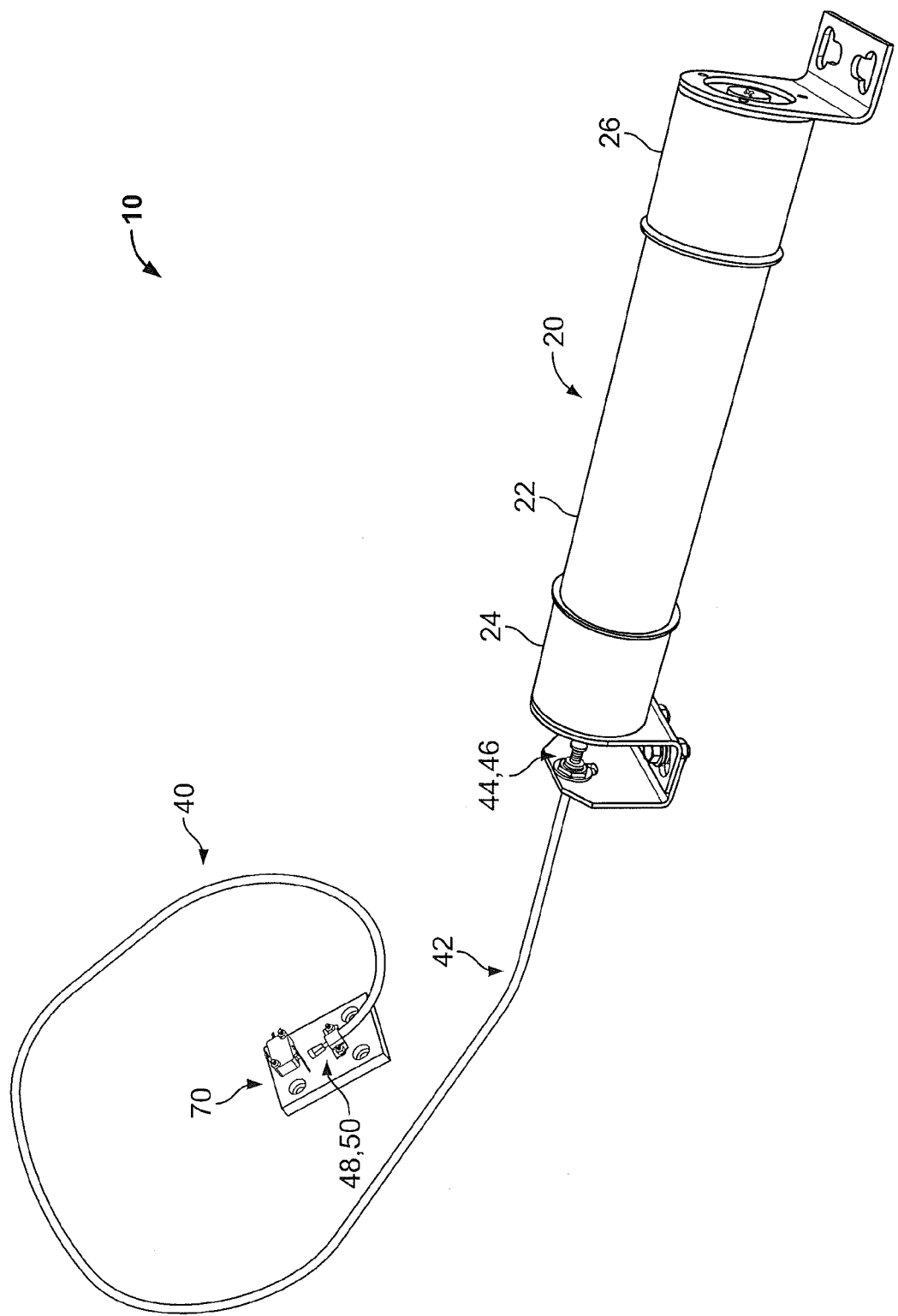
FIG. 1 is a schematic illustration of system including a fuse, a fuse operation indicator assembly and a switch according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A system 10 for remote monitoring of fuse operation according to some embodiments is illustrated in FIG. 1. The system 10 includes a fuse 20, a fuse operation indicator assembly 40 and a switch 70. The fuse operation indicator assembly 40 extends between the fuse 20 and the switch 70.

The fuse 20 may be a medium-voltage fuse (e.g., the fuse 20 may be configured to protect 2.4-145 kV systems). Referring to FIG. 1, the fuse 20 includes a tubular housing 22 formed of a suitable electrically insulating material. End caps 24, 26 are disposed at opposite ends of the housing 22 and are formed of a suitable electrically conducting material.

Figure 3A:
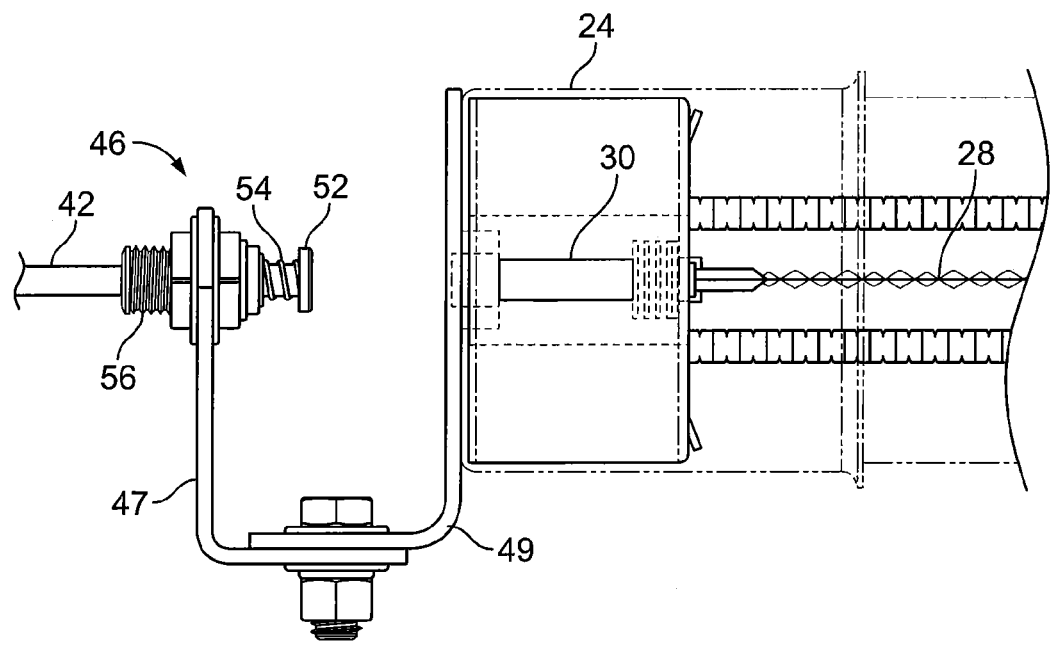
FIG. 3A is a fragmentary perspective view of the fuse and the fuse operation indicator assembly of FIG. 1 with a fuse striker pin in an ejected state.

Disposed within the housing 22 of the fuse 20 is at least one fusible element 28, as illustrated in FIG. 3A. Current through the fuse 20 is conducted under normal conditions by the fusible element 28. A striker or striker pin 30 is in the fuse 20, with one end of the striker pin 30 adjacent to or abutting the end cap 24. The striker pin 30 is shown in a retracted position in FIG. 3A.

An excessive current causes the fusible element 28 to melt and the fuse 20 is operated (i.e., the fuse is blown). In response, the striker pin 30 is ejected from the fuse 20 away from the end cap 24. The striker pin 30 is shown in an ejected or extended position in FIG. 3B. The striker pin 30 may be ejected in any manner known to those of skill in the art. For example, the striker pin 30 may be spring-actuated or pyrotechnic or powder-actuated as described in U.S. Pat. Nos. 4,322,706 and 5,367,281, the disclosures of which are incorporated herein in their entireties.

Figure 3B:
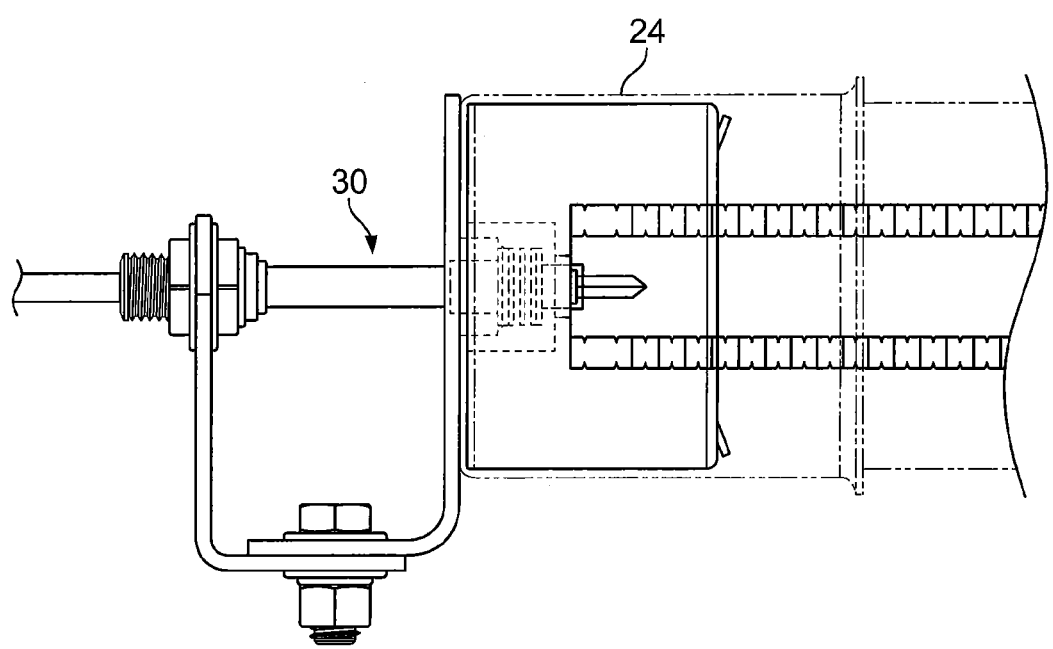
FIG. 3B is a fragmentary side view of the fuse and the fuse operation indicator assembly of FIG. 3A.

Referring to FIGS. 1, 3A and 3B, the fuse operation indicator assembly 40 includes an elongated tube 42. The tube 42 is formed of an electrically insulating material, such as a polymer. At a first end 44 of the tube 42 is a striker receiving member 46. At a second, opposite end 48 of the tube 42 is a actuating member 50. In some embodiments, the tube 42 has a length of at least 2 feet. In some embodiments, the tube 42 has a length of between about 2 to 4 feet.

Figure 2A:
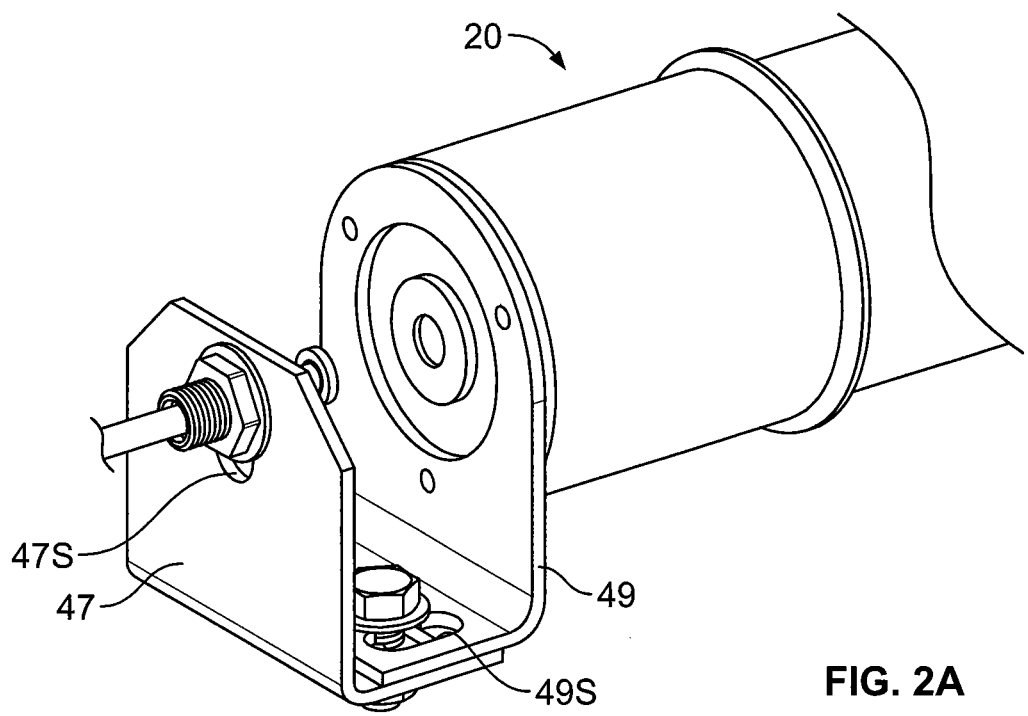
FIG. 2A is a fragmentary perspective view of the fuse and the fuse operation indicator assembly of FIG. 1 with a fuse striker pin in a retracted state.
Figure 2B:
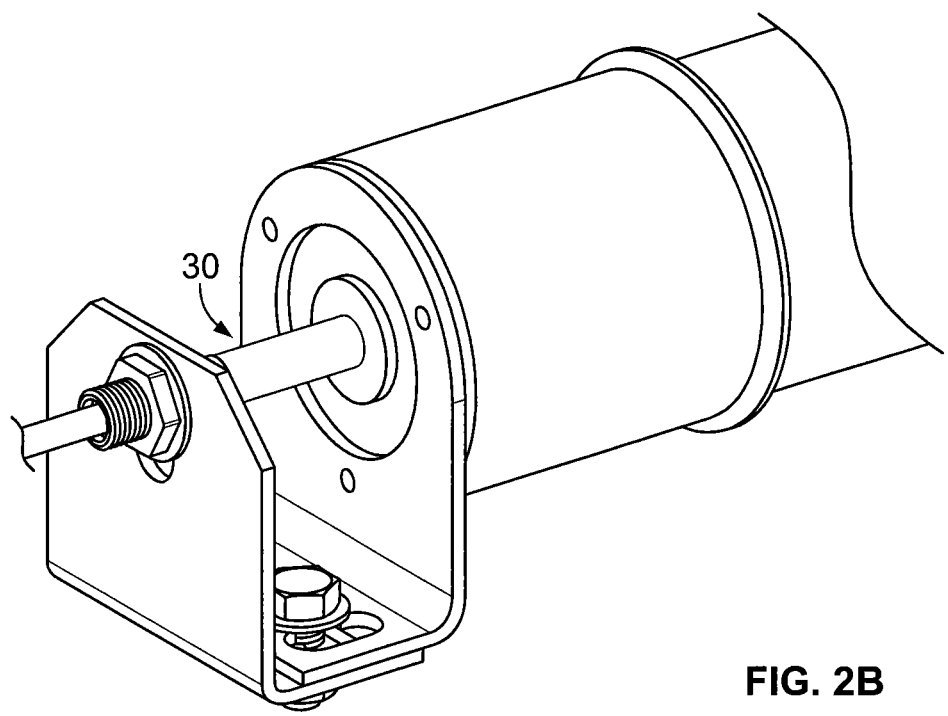
FIG. 2B is a fragmentary side view of the fuse and the fuse operation indicator assembly of FIG. 2A.

As illustrated, the striker receiving member 46 is mounted to a bracket 47 which in turn is mounted to a bracket 49 of the fuse 20. The brackets 47, 49 may include slots 47$s$, 49$s$ to facilitate adjustment of the position of the striker receiving member 46 relative to the fuse 20 (FIG. 2A).

The striker receiving member 46 may include a spring-loaded piston. Specifically, referring to FIG. 3A, the illustrated striker receiving member 46 includes a trip indicator piston 52 and a piston spring 54. The piston spring 54 biases the piston 52 toward the fuse 20. The striker receiving member 46 also includes a trip indicator body 56. The first end 44 of the tube 42 is received in the body 56.

Figure 4A:
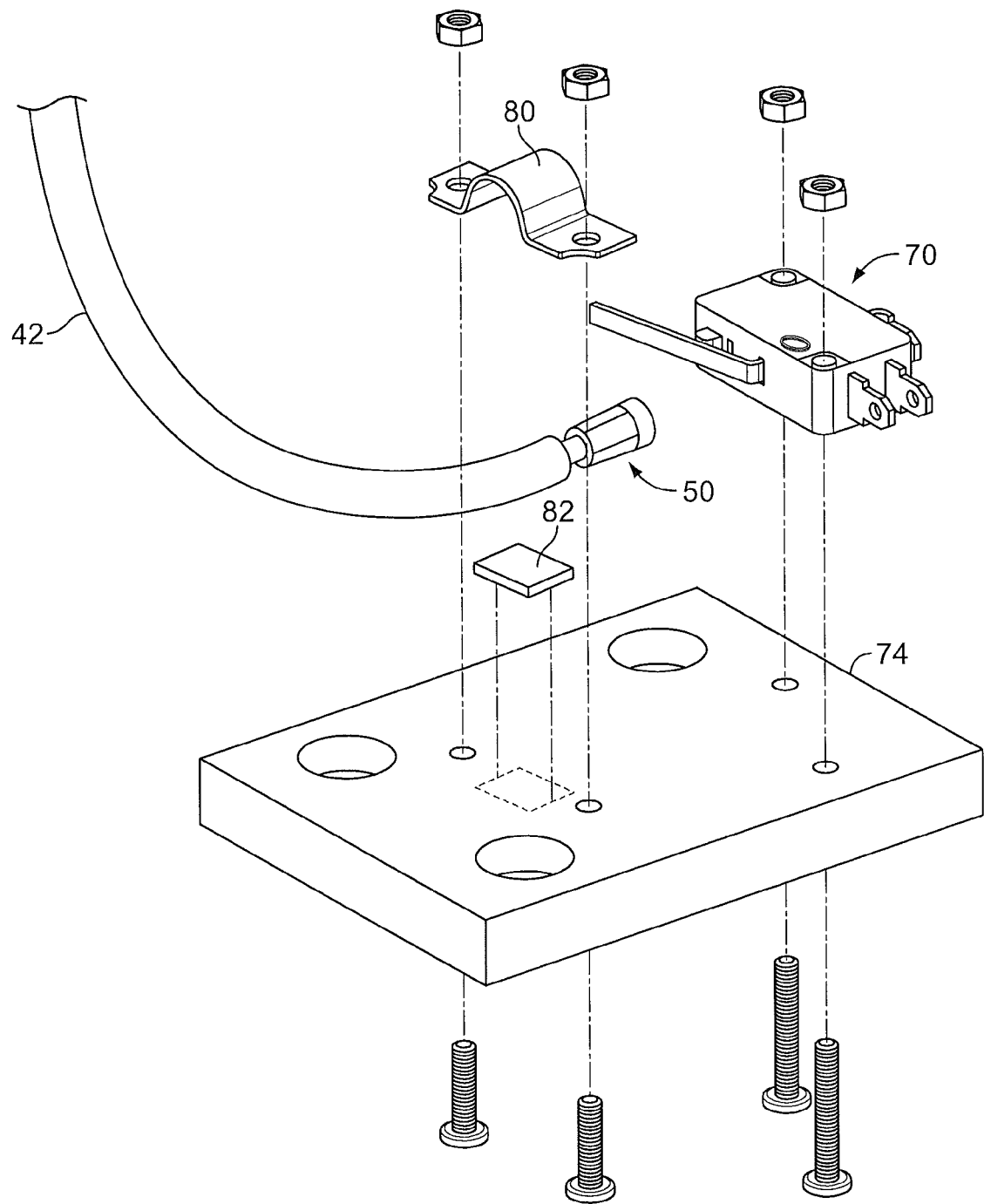
FIG. 4A is an exploded, fragmentary perspective view of the fuse operation indicator assembly and the switch of FIG. 1.
Figure 4B:
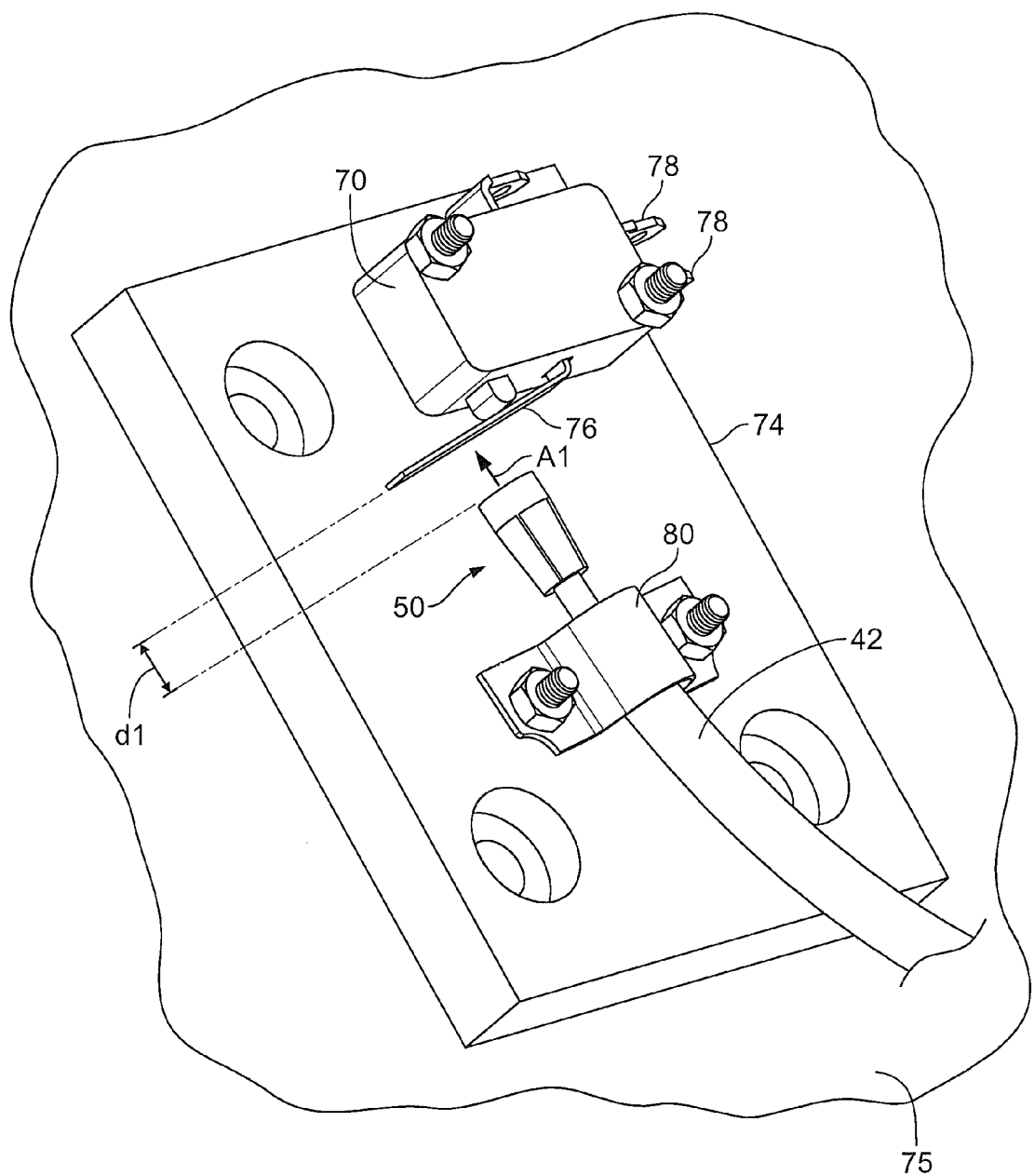
FIG. 4B is an assembled, fragmentary perspective view of the fuse operation indicator assembly and the switch of FIG. 4A.

As illustrated in FIGS. 4A and 4B, the switch 70 is mounted to a mounting block 74. The mounting block 74 may be mounted to a mounting surface 75, such as a mounting surface in electrical equipment (e.g., switchgear). The switch 70 may be an electric switch such as a miniature snap-action switch or a micro switch, for example. As illustrated, the switch 70 includes an actuator 76 and a plurality of contacts 78. As understood by those skilled in the art, upon actuation of the actuator 76, the contacts 78 may be closed or opened and an electrical signal may be detected or provided from the switch 70.

The actuating member 50 extends from the end of the tube 42, and the tube 42 is mounted to the mounting block 74 by a clamp 80. As shown in FIG. 4A, a pad 82 can be positioned between the tube 42 and the mounting block 74. The pad 82 may be formed of silicone, for example. The pad 82 may provide slip-resistance for the tube 42 (e.g., when air pressure is provided through the tube, as described below) and/or may be deformable to reduce deformation of the tube 42 as the clamp 80 is tightened to the mounting block 74.

The actuating member 50 is positioned a distance d1 from the switch actuator 76. In some embodiments, the distance d1 is between about 0.1 and 0.5 inches. In some embodiments, the distance d1 is about 0.25 inches.

In some embodiments, the switch 70, the mounting block 74 and associated components are included as part of the fuse operation indicator assembly 40.

The system 10 is configured to remotely monitor fuse operation, including providing remote indication that the fuse 20 has blown. As discussed above, when the fuse 20 is blown, the striker pin 30 moves from the retracted position (FIG. 3A) to the extended position (FIG. 3B). The striker pin 30 contacts and forcibly or rapidly depresses the piston 52 to the position shown in FIG. 3B. A puff or pulse of air is generated, and the puff or pulse of air travels through the tube 42 from the first end 44 to the second end 48 of the tube 42.

The puff or pulse of air urges the actuating member 50 in the direction indicated by the arrow A1 in FIG. 4B. The actuating member 50 contacts and actuates the switch actuator 76 and closes an electrical circuit associated with one of the switch contacts 78.

It is contemplated that the puff or pulse of air may provide sufficient force to actuate the switch actuator 76. For example, the actuating member 50 may be omitted and the puff or pulse of air emitted from the second end 48 of the tube 42 may actuate the switch actuator 76. Alternatively, the actuating member 50 may include an orifice or the like through which the puff or pulse of air is emitted to actuate the switch actuator 76.

Figure 5:
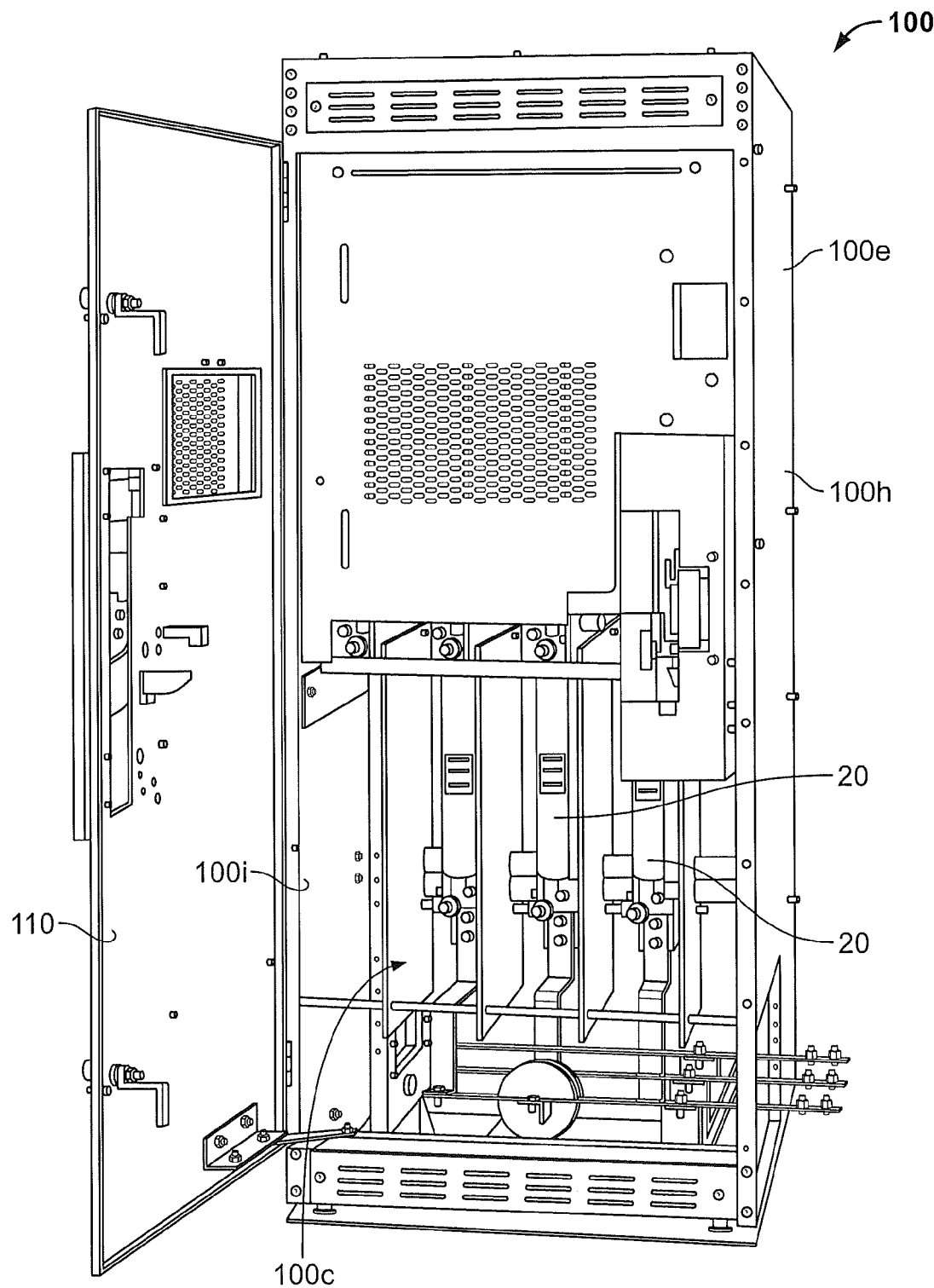
FIG. 5 is a perspective view of a piece of electrical equipment with fuses mounted therein.

Turning now to FIG. 5, one or more of the fuses 20 may be mounted in a piece of electrical equipment, such as switchgear 100. The switchgear 100 includes a housing 100$h$ and a front panel 110. The front panel 110 is shown in an open position exposing a cavity 100$c$ defined by the housing 100$h$ and the front panel 110. The housing 100$h$ has an interior surface 100$i$ and an exterior surface 100$e$. The mounting surface 75 for the switch 70 and/or the mounting block 74 may be on the interior surface 100$i$ or elsewhere in the housing 100$h$.

Figure 6:
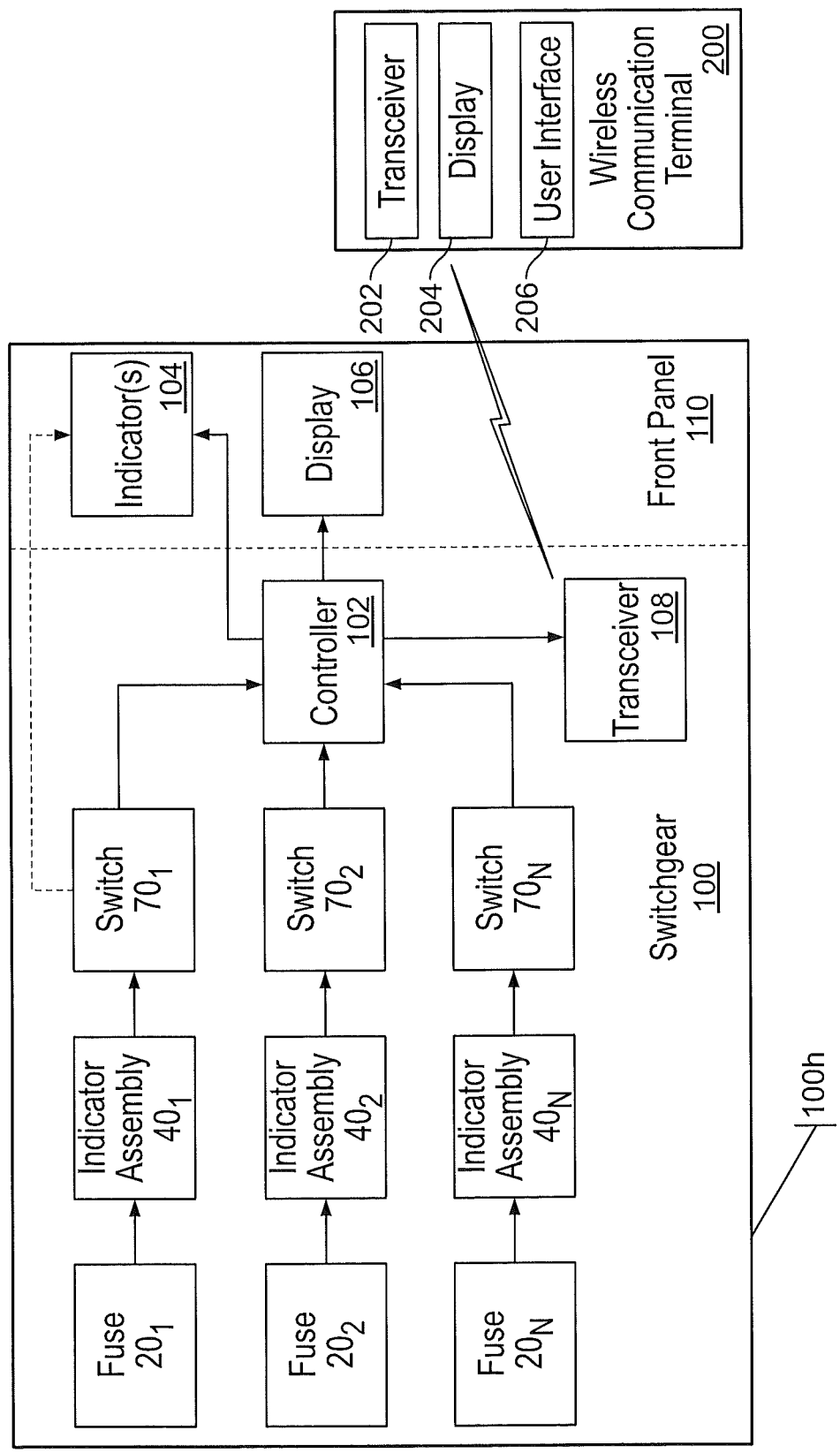
FIG. 6 is a block diagram illustrating a piece of electrical equipment with the system of FIG. 1 installed therein.

Therefore, in some embodiments, the system 10 may be located in the housing 100$h$. As shown in FIG. 6, a plurality of fuses $20_1$, $20_2$, $20_N$ are positioned in the housing 100$h$ of the switchgear 100. Also as shown, a plurality of indicator assemblies $40_1$, $40_2$, $40_N$ and a plurality of switches $70_1$, $70_2$, $70_N$ are provided in the housing 100$h$. Each indicator assembly 40 is positioned between respective ones of the fuses 20 and switches 70 in the manner described above. One of the switch contacts 78 for each switch 70 may be electrically connected with an indicator 104 (e.g., an LED) that may be positioned on the exterior of the housing 100$h$ of the switchgear 100, on a front door or panel 110 of the switchgear 100, or otherwise positioned away from the switchgear 100. Although only switch $70_1$ is shown electrically connected to an indicator 104, it is contemplated that switch $70_2$ and/or $70_N$ are connected to indictors 104 such that a technician or the like can identify which of the fuses 20 is operated or blown (e.g., the indicators 104 may be color coded or may be positioned to provide information identifying the fuse 20 and/or the location thereof).

In some embodiments, the switches 70 may be electrically connected to a controller 102. The controller 102 may be configured to operate the indicators 104. In some embodiments, the controller 102 is configured to operate a display 106 which may be provided on the exterior of the switchgear housing 100$h$, on the front panel 110, or otherwise positioned away from the switchgear 100. The display 106 may be configured to display operating conditions of the fuses 20, including identifying operated or blown fuses. The display 106 may provide identifying information such as the location(s) of the blown fuse(s).

In some embodiments, the controller 102 is configured to operate a transceiver 108 that is configured to transmit wireless signals to an electronic device 200 such as a computer (desktop, laptop, tablet, etc.), a smartphone or some other wireless communication terminal. The transceiver 108 may wirelessly transmit data including identifying information such as operating conditions of the fuses, the location of any blown fuses, etc. The electronic device 200 may include a transceiver 202 to receive the wireless signals from the switchgear transceiver 108 and may include a display 204 to view identifying information sent by the switchgear transceiver 108. The electronic device 200 may also send wireless signals to the switchgear 100, for example to query the controller 102 as to the operating condition of the fuses 20 (e.g., using user interface 206). A wireless interface between the switchgear 100 and the electronic device 200 may be any suitable type of wireless interface. According to some embodiments, the wireless interface is a radiofrequency (RF) wireless interface. The wireless interface may be a wireless local area network (WLAN) interface, a direct point-to-point wireless interface and/or a cellular communication wireless interface.

Figure 7A:
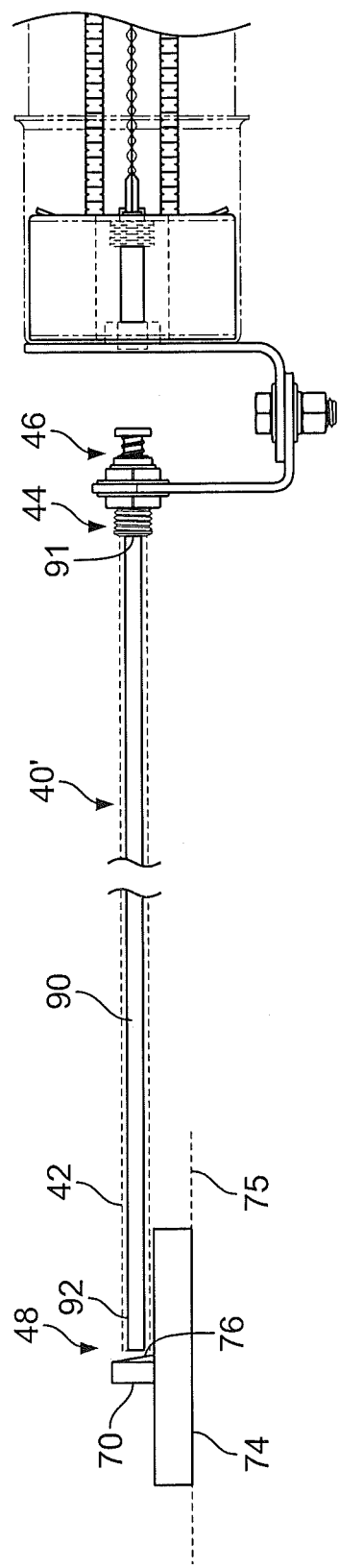
FIG. 7A is a schematic illustration of system including a fuse, an alternative fuse operation indicator assembly and a switch according to some embodiments, with a fuse striker pin in a retracted state.
Figure 7B:
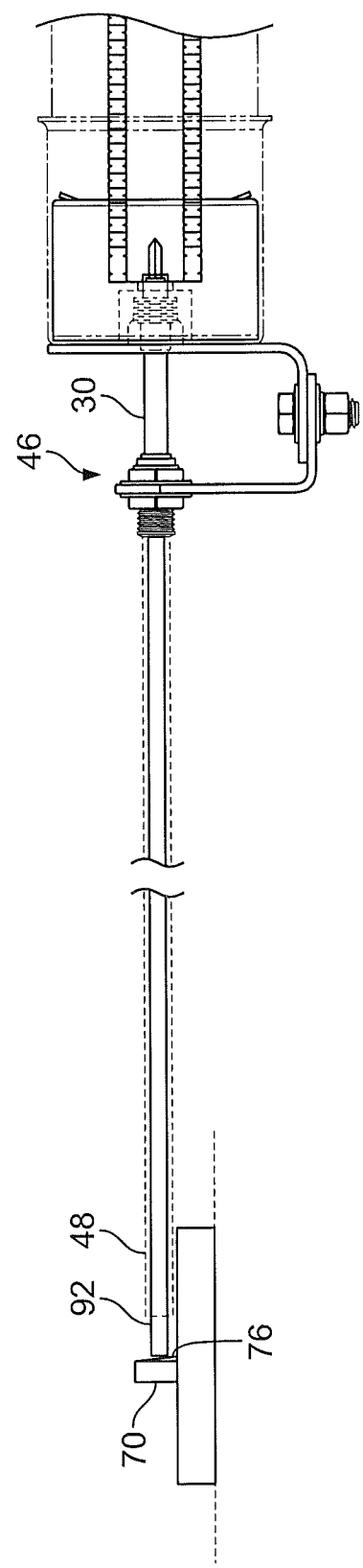
FIG. 7B is a schematic illustration of the system of FIG. 7A with the fuse striker pin in an ejected state.

An alternative fuse operation indicator assembly 40' is illustrated in FIGS. 7A and 7B. The assembly 40' includes an electrically insulating member 90 that may be rigid or semi-rigid (e.g., a rod or cable). As illustrated, the member 90 is slidably held in the tube 42, although the tube 42 may be omitted and another sheath-like structure can be provided in its place. The member 90 has a first end 91 at or near the tube first end 44 and the striker receiving member 46; the member 90 has an opposite second end 92 at or near the tube second end 48. In the state shown in FIG. 7A, the second end 92 is positioned adjacent the switch 70 and the switch actuator 76.

As described above, when the fuse 20 is blown, the striker pin 30 is ejected from the fuse 20 and forcibly contacts the striker receiving member 46. As shown in FIG. 7B, the rod 90 translates such that the rod second end 92 contacts the switch actuator 76. In some embodiments, and as shown, the rod 92 slides out of the tube second end 48 and contacts the switch actuator 76. The switch 70 sends a signal to provide remote indication that the fuse has operated or blown in the manner described above.

Figure 8A:
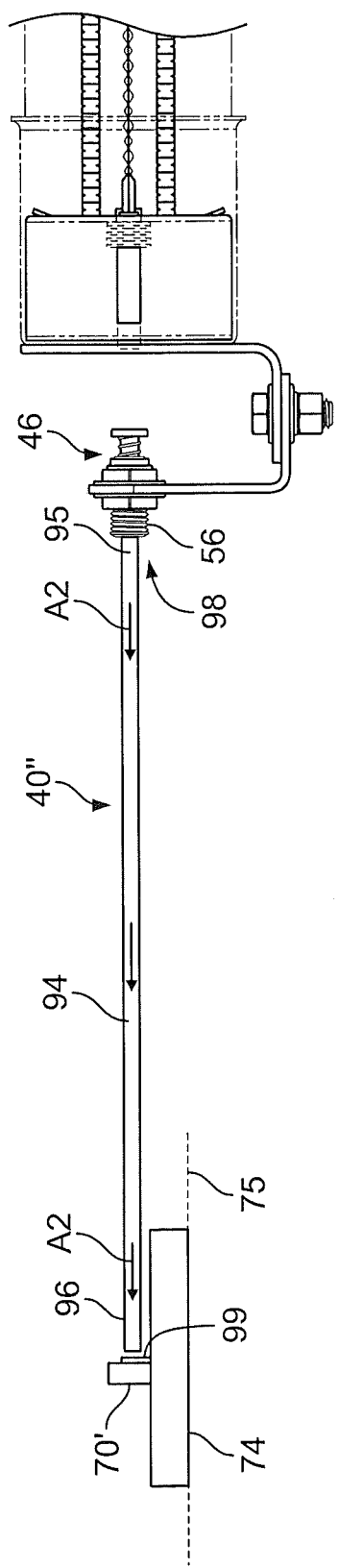
FIG. 8A is a schematic illustration of system including a fuse, a further alternative fuse operation indicator assembly and a switch according to some embodiments, with a fuse striker pin in a retracted state.
Figure 8B:
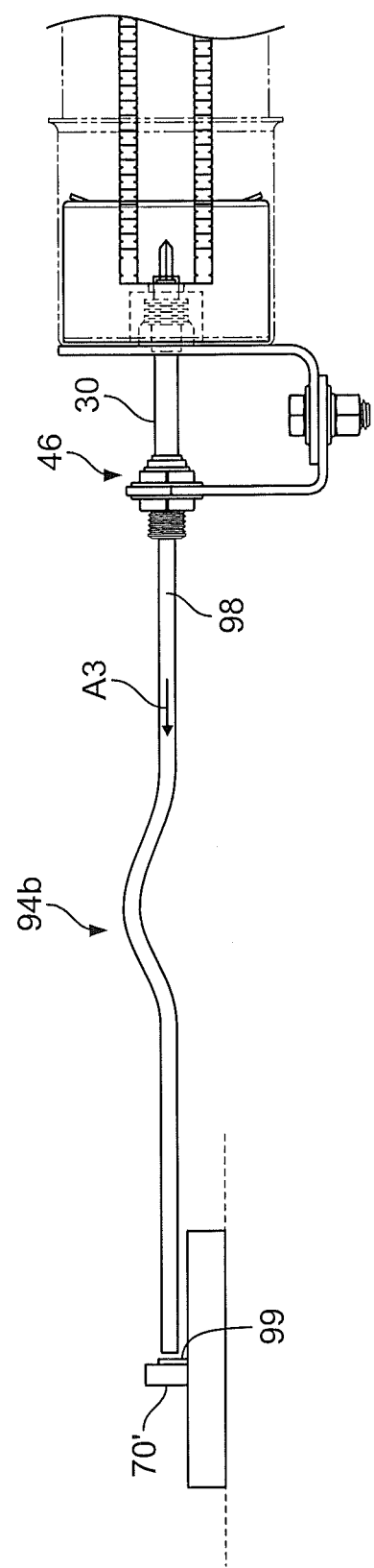
FIG. 8B is a schematic illustration of the system of FIG. 8A with the fuse striker pin in an ejected state.

Another alternative fuse operation indicator assembly 40" is illustrated in FIGS. 8A and 8B. The assembly 40" includes a light-transmitting flexible cable 94. The cable may be a fiber optic cable, for example. The cable 94 has a first end 95 at or near the striker receiving member 46 and a second, opposite end 96 at or near a switch 70'. The switch 70' is substantially similar to the switch 70 described above except the switch 70' includes a light detector 99. In the illustrated embodiment, a light emitter 98 is provided at or near the striker receiving member 46. For example, the light emitter 98 may be in the body 56. Light is transmitted through the cable 94 from the first end 95 to the second end 96 and received at the light detector 99, as illustrated by the arrows A2.

As described above, when the fuse 20 is blown, the striker pin 30 is ejected from the fuse 20 and forcibly contacts the striker receiving member 46. As shown in FIG. 8B, the flexible cable 94 bends, as indicated by the bend 94b. Light emitted by the light emitter 98, indicated at arrow A3, is not received at the light detector 99 because of the bending of the cable 94. As a result, the switch 70' sends a signal to provide remote indication that the fuse has operated or blown in the manner described above.

It will be understood that the alternative fuse operation indicator assemblies 40' or 40" may be used in place of the fuse operation indicator assembly 40. For example, one of the fuse operation indicator assemblies 40' or 40" may be used in the system 10 (FIG. 1) or in the switchgear 100 (FIG. 6).

Embodiments of the invention allow a user to remotely be aware of fuse operation or lack of operation. It is undesirable to use metal wires or the like to provide signals because the conductive metal wires may cause electrical failures in the equipment. Embodiments of the present invention use elongated electrically insulating (non-conductive) members such as plastic tubes and rods as well as non-conductive air or light that will not cause flashovers. Embodiments of the invention allow for fuse operation or lack or operation to be viewed remotely. Accordingly, a technician or user can safely observe fuse operation well away from the switchgear and away from potential arc flash energy.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A switchgear, comprising:
    a housing;
    a plurality of fuses mounted within the housing, each fuse having a striker pin that is ejected from the fuse when the fuse is operated;
    a plurality of fuse operation indicator assemblies mounted within the housing, one for each fuse, the fuse operation indicator assembly comprising:
        an electrically insulating elongate tube having first and second ends;
        a fuse striker receiving member at the first end of the tube, wherein the fuse striker receiving member receives the fuse striker pin when it is ejected from the fuse, and wherein the fuse striker receiving member comprises a spring-loaded piston that generates a puff of air through the tube when the fuse striker receiving member receives the fuse striker pin; and
        an electric switch comprising a switch actuator spaced apart from the second end of the tube, wherein the switch actuator is actuated by the puff of air generated by the spring-loaded piston;
    wherein the electric switch and the fuse are mounted in the housing in a spaced-apart relationship.

2. The switchgear of claim 1, wherein the electric switch generates an electrical signal when the switch actuator is actuated by the puff of air.

3. The switchgear of claim 2, wherein the fuse indicator assembly comprises a mounting block mounted in the housing, and wherein:
    the electric switch is mounted on the mounting block; and
    the second end of the tube is held adjacent the electric switch by a clamping device that is mounted to the mounting block.

4. The switchgear of claim 2, further comprising a plurality of indicators outside the housing, each indicator electrically connected with a respective electric switch, wherein each indicator receives the electrical signal and, in response, indicates that the fuse is operated.

5. The switchgear of claim 2, further comprising a controller and a display, the display being outside the housing, the controller electrically connected with each switch of the plurality of fuse operation indicator assemblies, wherein the controller receives the electrical signals from the switches and controls the display to display identifying information associated with the electrical signals.

6. The switchgear of claim 5, wherein the identifying information includes an identification and/or location of one or more fuses that have operated.

7. The switchgear of claim 2, further comprising a controller and a transceiver, the controller electrically connected with each switch of the plurality of fuse operation indicator assemblies, wherein the controller receives the electrical signals from the switches and controls the transceiver to wirelessly transmit identifying information associated with the electrical signals to an outside device.

8. The switchgear of claim 7, wherein the identifying information includes an identification and/or location of one or more fuses that have operated.

9. The switchgear of claim 1, further comprising an actuating member movably disposed at the second end of the tube and spaced apart from the switch actuator, wherein the puff of air generated by the spring-loaded piston causes the actuating member to move and contact the switch.

10. The switchgear of claim 1, further comprising an actuating member at the second end of the tube and spaced apart from the switch actuator, the actuating member comprising an orifice through which the puff of air is emitted to actuate the switch actuator.

11. The switchgear of claim 3, further comprising a deformable pad between the mounting block and the second end of the tube.

\* \* \* \* \*